United States Patent Office 2,995,867
Patented Aug. 15, 1961

2,995,867
SEED PELLET CONTAINING INOCULANT
Joe C. Burton, Milwaukee, Wis., assignor to The Nitragin Company, Inc., Milwaukee, Wis., a corporation of Wisconsin
No Drawing. Filed Sept. 25, 1958, Ser. No. 763,163
3 Claims. (Cl. 47—1)

This invention relates to seed pellets and to a product which is used with an inoculant for seeds of leguminous plants.

One object of this invention is to provide such a product which when used with the inoculant so increases the effective life and usefulness of the inoculant that it can be applied to the seeds long prior to planting, thus permitting the planter to apply the inoculant at his convenience, and making it possible for seed dealers and elevator operators to apply the inoculant to large volumes of seeds for planters.

Another object of this invention is to provide such a product which when applied with the inoculant to such seeds enables them to more efficiently pass through the drill without clogging and without material loss of the inoculant in such handling.

A further object of this invention is to provide such a product which effects uniform dispersion of the bacteria in the inoculant as applied to the seeds and so conditions the inoculant that it can be easily applied to a large volume of seeds in a slurry mixer or the like.

Still another object of this invention is to provide such a product which will protect the bacteria in the inoculant after the seeds have been planted under adverse soil and weather conditions.

These objects are accomplished by a product which contains a bacteria nutrient additional to that normally incorporated in well-known inoculants of bacteria and peat carrier (see U.S. Patents 2,200,532 and 2,726,948), a water soluble gum and a dispersing agent. The bacteria nutrient additional to that normally included or incorporated in the well known commercially marketed inoculants is not necessarily the same kind of nutrient. The peat carrier in itself forms one kind of nutrient while additional nutrient may be sugar (sucrose). This product in powdered form is mixed with the well-known inoculant of bacteria and peat carrier and applied as a water solution to the seeds. The dispersing agent, while having some value as a bacteria nutrient, cooperates with the water soluble gum, the bacteria nutrient and the inoculant to form a stable suspension with the bacteria uniformly dispersed. This solution can be readily applied to the seeds in a large slurry mixer and each seed covered with a film which upon drying forms a protective coating. Since the solution is stable, there is no need for immediate application to the seeds thus making it more convenient for the planter and others to use.

The water soluble gum coating forms a buffer for the live bacteria and adheres them to the seed so that there is no substantial loss of bacteria when the seeds are subsequently handled and planted in drills. The coating being smooth, slippery and durable also makes the seeds pass readily through the drill without clogging.

The additional bacteria nutrient and the coating keeps the bacteria therein alive and effective for over two weeks. Hence, the seeds may be planted many days after the application of the coating. This enables the planter-farmer to treat his seeds on days when weather conditions prevent plowing, tilling, and the like or at other times convenient to him. It also permits seeds to be coated in mass volume by dealers and elevator operators and subsequently delivered in smaller amounts to numerous planters.

Seeds coated with this product and inoculant when planted under adverse conditions such as heat and drought will preserve the bacteria in a viable state to a better extent than heretofore obtained.

The water soluble gum may be synthetic methylcellulose in fine powdered form. This is a long-chain cellulosic polymer, essentially a dimethyl ether of cellulose. It is the reactive product of wood pulp or purified cotton linters, caustic soda and methylchloride. Its methoxyl content is in a range from 27.5% to 32.0% to give maximum water solubility. It is a hydrophilic colloid which dissolves by successive hydration of structural layers. It has a bulk density of about 0.35 to 0.46 g./cc.

Since the powdered water soluble gum does not disperse readily in cold water (because a gelatinous membrane is formed) and since the use of hot water is not practical under any circumstances, it is blended with a dispersing agent. One such dispersing agent is powdered synthetic hydrated calcium silicate or diatomaceous calcium silicate. It has the advantage of also having some neutralizing value and some bacteria nutrient value. Its neutralizing value may be useful when the product is applied with the inoculant to seeds which are planted in an acid soil. Other dispersing agents are powdery materials of approximately the same bulk density as the water soluble gum such as sugar, milk, calcium carbonate, and phosphate compounds (tricalcium phosphate).

While some of the dispersing agents are also bacteria nutrients, others do not have such property or are not complete as a nutrient. It is therefore advisable to include additional bacteria nutrient. With the synthetic hydrated calcium silicate it has been found that powdered sugar provides the essential additional bacteria nutrient without other disadvantages.

These three principle ingredients can be used in various proportions. It is preferable that the mixture contain no more than one third of the synthetic cold water soluble gum. The most advantageous mixture is one third of each of the synthetic water soluble gum (methylcellulose), the additional bacteria nutrient (powdered sugar), and the dispersing agent (synthetic calcium silicate). These proportions by weight provide a mixture which quickly goes into solution in cool water and provides a uniform stable dispersion.

Such product or mixture, a fine gray powder, is mixed with the inoculant and water and the seed coated with such solution in the manner heretofore customary for the water-slurry coating of the seed with the inoculant only. First, the mixture is put into solution with clear cool water using about 1½ lbs. to 3 gallons of water. Then the inoculant (bacteria and peat) is added. Most inoculants have directions for their use with various types and sizes of seeds. These directions are followed. For example for peas 3 packages of the 20-bushel size (13½ lbs.) of the inoculant is used with the 3 gallons of such solution. This will make enough inoculant slurry for about 60 bushels of peas. For soybeans 2 packages of 25-bushel size (9 lbs.) of special soybean inoculant is used with the 3 gallons of solution to make enough slurry for about 50 bushels of soybeans.

When using a slurry treater, it is mounted so that the seed can be fed to it continuously and automatically. Flow through the treater is regulated by the seed-gate setting and the weighting of the counterbalance arm of the weighing or measuring pan. The treater is adjusted so that the proper amount of the inoculant slurry is dumped into the mixing chamber along with the proper amount of seed. For example with peas, setting of the slurry treater is such that 300 cc. of the inoculant slurry is applied to 60 lbs. of pea seed. With smaller legume seeds such as alfalfa, it is preferable to adjust the treater to apply at least 600 cc. of the inoculant slurry to 60 lbs. of seed.

The seeds so coated in the slurry seed treater may be bagged for transfer to the seed drill. They can be used in the planter at least a week later. Under some conditions this time may be extended for over two weeks.

I claim:

1. A product used in the inoculation coating of seeds of legume plants effective when applied to seeds over 24 hours prior to planting, comprising powdered sugar as a bacteria nutrient additional to that normally incorporated in the inoculant, powdered synthetic hydrated calcium silicate as a dispersing agent for uniformly dispersing a powdered methylcellulose in a cold water solution, and powdered methylcellulose.

2. The product defined in claim 1 in which said ingredients are in substantially equal proportions by weight.

3. A pellet containing a legume seed surrounded by a coating including live bacteria capable of inoculating said seed and a bacteria nutrient additional to that normally included in the production of cultures of said live bacteria all uniformly dispersed in and bound by a cold water soluble synthetic gum, said coating being characterized by being (a) capable of keeping the bacteria therein alive and effective for more than 24 hours after application of said coating and prior to contact with soil moisture, and (b) smooth, slippery and durable

References Cited in the file of this patent

UNITED STATES PATENTS

| | | |
|---|---|---|
| 679,601 | Caron | July 30, 1901 |
| 2,502,809 | Vogelsang | Apr. 4, 1950 |
| 2,570,537 | Finch | Oct. 9, 1951 |

FOREIGN PATENTS

| | | |
|---|---|---|
| 411,040 | Germany | Mar. 24, 1925 |
| 741,378 | Great Britain | Nov. 30, 1955 |

OTHER REFERENCES

Condensed Chemical Dictionary, fifth edition, published by Reinhold (N.Y.), 1956, pages 36, 37, 405, 541, relied on.